United States Patent [19]

Tsuchiya et al.

[11] Patent Number: 5,408,629
[45] Date of Patent: Apr. 18, 1995

[54] APPARATUS AND METHOD FOR CONTROLLING EXCLUSIVE ACCESS TO PORTIONS OF ADDRESSABLE MEMORY IN A MULTIPROCESSOR SYSTEM

[75] Inventors: Kenichi Tsuchiya, New Brighton; Glen R. Kregness, Minnetonka; Ferris T. Price deceased, late of Mayer, by Robert Howe Price, legal representative; Gary J. Lucas, Pine Springs, all of Minn.

[73] Assignee: Unisys Corporation, Blue Bell, Pa.

[21] Appl. No.: 929,329

[22] Filed: Aug. 13, 1992

[51] Int. Cl.6 .................. G06F 15/16; G06F 13/18
[52] U.S. Cl. .................. 395/425; 364/DIG. 1; 364/228.1; 364/243.41; 395/200
[58] Field of Search ... 364/200 MS File, 900 MS File; 395/200, 425

[56] References Cited

U.S. PATENT DOCUMENTS

| | | | |
|---|---|---|---|
| 4,604,694 | 8/1986 | Hough | 395/650 |
| 4,847,754 | 7/1989 | Obermarck et al. | 395/650 |
| 5,016,166 | 5/1991 | Van Loo et al. | 395/650 |
| 5,142,676 | 8/1992 | Fried et al. | 395/425 |
| 5,230,070 | 7/1993 | Liu | 395/425 |
| 5,263,161 | 11/1993 | Barth et al. | 395/650 |
| 5,297,269 | 3/1994 | Donaldson et al. | 395/425 |
| 5,301,290 | 4/1994 | Tetzlaff et al. | 395/425 |

OTHER PUBLICATIONS

Mano, Computer System Architecture, 2nd ed., 1982, pp. 461–462.

Primary Examiner—Glenn A. Gossage
Assistant Examiner—Matthew M. Kim
Attorney, Agent, or Firm—LeRoy D. Maunu; Charles A. Johnson; Mark T. Starr

[57] ABSTRACT

A method and apparatus for granting exclusive access to a selected portion of addressable memory to a requesting processor in a large scale multiprocessor system. An instruction processor having a store-through operand cache executes an instruction requiring exclusive access to an address in a shared memory. If the address upon which the lock is requested is not in the local cache, the instruction processor simultaneously sends a lock and read request to the coupled storage controller. Otherwise, a no-operand-read and lock request is sent to the storage controller. If, while processing the lock request, no conflict is detected by the storage controller, the address is marked as locked and a lock granted signal is issued to the requesting processor. Concurrent with the processing the lock request the storage controller processes the read request. The lock granted signal and requested data are returned to the requesting processor asynchronously. The requesting processor can continue processing the lock instruction when the lock granted and required data have been returned from the storage controller. When two or more processors contend for a lock on a the same portion of addressable memory, one processor is granted the lock while the other contending processor(s) are forced to wait. Lock contention is arbitrated by a round robin priority scheme.

16 Claims, 6 Drawing Sheets

APPARATUS AND METHOD FOR CONTROLLING EXCLUSIVE ACCESS TO PORTIONS OF ADDRESSABLE MEMORY IN A MULTIPROCESSOR SYSTEM

CROSS REFERENCE TO CO-PENDING APPLICATIONS

The present application is related to U.S. Pat. application Ser. No. 08/235,196, which is a continuation of application Ser. No. 07/762,276, entitled "Data Coherency Protocol for Multi-level Cached High Performance Multiprocessor System", filed Sep. 19, 1991 and assigned to the assignee of the present invention. The related patent application is herein incorporated by reference.

BACKGROUND OF THE INVENTION

A. Field of Invention

This invention relates to the area of data processing systems where a plurality of processors are competing for exclusive access to a portion of an addressable memory.

B. Status of the Prior Art

In data processing systems having multiple processors sharing a common addressable memory, a plurality of programs or processes are executed in parallel. This yields the advantage of increased throughput performance over machines where there is a single processor executing a single process.

Where there are multiple processes cooperating to perform a programmed function, a high level of coordination is necessary to ensure proper operation where resources are shared. One resource which may be shared in multi-processor data processing systems is addressable memory. It is well known in the art that machine language macro-instructions such as the biased-fetch, test-and-set, increment-and-test, or conditional-replace can be provided to accommodate the sharing of addressable memory. During execution of these instructions, the portion of memory upon which the operation is being performed is exclusively held, or "locked", by the processor executing the instruction; thus, they are referred to as "storage lock instructions". Should another processor attempt to execute a similar type of instruction on the same portion of memory while the first processor has that portion of memory locked, the second processor will be denied access to the storage location until the first processor has completed its exclusive use operation and has released the lock.

Each new generation of data processing systems has brought architectures having more and faster processors to drive the system. With respect to storage lock instructions, each generation has sought to keep the time required to coordinate lock processing to a minimum and maximize system performance.

The two basic approaches to storage lock operations are the "distributed" and "centralized" approaches. In the centralized approach to locking storage, the particular storage unit being locked contains the locking logic, and a lock granted signal must be provided to the processor requesting the lock to indicate that it has exclusive use of the requested storage location. In contrast, the distributed approach places the locking logic within each processor. Where each processor has the locking logic, a high level of coordination between the processors is necessary to ensure that a deadlock situation does not occur.

The distributed approach to processing storage lock instructions is shown in U.S. Pat. No. 4,984,153 issued Jan. 8, 1991 to Glen Kregness et al. for a "Storage Locking Control for a Plurality of Processors Which Share a Common Storage Unit" and assigned to Unisys Corporation, wherein each of the processors keeps a copy of each location in the shared storage which is locked by each of the processors. Special arbitration logic is provided to deal with the case where two processors request a lock simultaneously. This approach places the arbitration and locking logic at the processor level of the architecture, and results in lock processing overhead for the processor which is directly proportional to the number of processors in the system. Furthermore, with the point-to-point communications shown, the space required for inter-processor cabling drastically increases as each additional processor requires cables between the it and each processor already in the system.

The "Lock Control for a Shared Storage in a Data Processing System" described in U.S. Pat. No. 4,733,352, issued Mar. 22, 1988 to Kouji Nakamura et al., shows a plurality of processors sharing a main storage through a plurality of storage controllers. Each storage controller is coupled to a main storage unit and processes the main storage requests for each of the coupled processors. While the described locking mechanism removes the locking logic from the processors and thereby reduces the cabling between the processors, its locking mechanism has each locking unit maintaining a copy of lock information stored in the other locking unit. When the lock information is duplicated in the lock units, extra logic hardware is required to synchronize the lock operation between each of the lock units.

The "Shared Resource Locking Apparatus" described by Starr in the International Patent Application published under the Patent Cooperation Treaty, International Pub. No. WO 83/04117, has a hardware lock unit for limiting concurrent use of shared memory in a data processing system with a bus architecture. The publication shows that where the lock unit is centralized with respect to the resource being locked, logic for coordinating between lock units is unnecessary. When a processor wishes to lock a selected portion of addressable memory, it sends its processor identification, a read command, and an address indicating the memory portion to be locked over the system bus to the shared memory unit. The shared memory unit then checks whether the memory portion indicated is already locked by another processor. If so, the lock request is held and the read from memory is not performed. The requesting processor must await its turn to lock the indicated portion of memory, and the shared memory unit waits until the lock is granted to perform the read operation. Each portion of the shared memory that is to be treated as a separate lockable resource has a lock register. The lock register contains an identifier for the requestor currently having the resource locked, and a bit map field indicating which processors have lock requests outstanding for the resource.

The above-referenced patents do not disclose the system of the present invention for locking a portion of addressable memory. The system set forth reduces the locking logic by centralizing the locking control, minimizes the point-to-point cabling necessary for multiple processors, performs the lock control and memory read operations in parallel, and detects when processors become inoperative to avoid deadlock. These and other advantages are described in more detail in the following discussion.

OBJECTS OF THE INVENTION

It is therefore a primary object of the present invention to provide an improved storage locking system for data processing systems having a plurality of processors contending for exclusive use of a portion of addressable memory.

Yet another object of the present invention is to minimize the processing overhead for processors requesting exclusive use of a portion of addressable memory.

It is a further object of the present invention to perform a storage lock operation and storage read operation concurrently.

It is also an object of the present invention to avoid deadlock situations by releasing a storage lock when a processor, which has been granted a lock on a portion of memory, becomes inoperative.

It is still a further object of the present invention to provide a storage locking system for data processing systems having a plurality of processors and a plurality of addressable memories of which a selected portion can be locked.

It is a further object of the present invention to eliminate the point-to-point connections between a plurality of processors requesting lock operations on a plurality of shared addressable memories.

SUMMARY OF THE INVENTION

According to the present invention, a set of lock registers is provided for storing the address of the selected portions of memory which are in exclusive use by the processors in the data processing system. An associated lock register is provided for each processor in the system. When a processor requests and is granted exclusive use of the selected portion of memory, a lock bit associated with the particular lock register is set to indicate that the associated processor has exclusive use of the selected portion of memory indicated by the address stored in the lock register; and a lock granted signal is returned to the requesting processor. If the selected portion of memory upon which the processor requests exclusive use is already locked by another processor, a lock request bit associated the particular lock register is set to indicate that the requesting processor has requested exclusive use of the selected portion of memory indicated by the address stored in the associated lock register.

When a processor releases the exclusively held selected portion of memory after completing execution of a storage lock instruction, the lock bit associated with the lock register for the processor is cleared. Lock-priority logic selects one of the processors which has its lock request bit set and whose address stored in the associated lock register is equal to the address stored in the lock register of the processor releasing the lock, to be the next processor to receive exclusive use of the selected portion of memory. The priority logic utilizes a round-robin priority scheme. The lock-bit associated with the selected processor is set, a lock-granted signal is returned to the requesting processor, and the lock-request bit for the selected processor is cleared.

In another aspect of the present invention, the lock-control logic is distributed among a plurality of storage controllers, wherein each of the storage controllers controls access to the memory to which it is directly coupled. Each storage controller also has a plurality of processors to which it is directly coupled. Furthermore, each storage controller is directly coupled to each of the other storage controllers, thereby providing a directly coupled processor with indirect access to the addressable memory directly coupled to another storage controller. A processor seeking access to addressable memory first sends the memory request (an example being a lock-request) to its directly coupled storage controller. If the requested address is in the addressable memory controlled by the directly coupled storage controller, it processes the request. If the requested address is not in its addressable memory, the storage controller sends the request to the appropriate storage controller. A lock-request is sent to the lock-control logic in the storage controller for which the memory request was requested and processed as described above.

Three particular advantages are realized with the design of the present invention. First, the advantages of point-to-point communication with the advantages of centralized locking logic. The controllers which control the resource to be locked are directly coupled one to another, thereby minimizing the time required to communicate with one another. Furthermore, the locking logic is centralized in each of the controllers, and each controller is directly coupled to a plurality of processors which may make a lock request. Centralizing the lock logic in the controllers removes the lock processing overhead from the requesting processors and further eliminates the interprocessor cabling necessary when the lock logic is distributed among the requesting processors.

Second, increased performance via a parallel processing of read-lock operation is realized. Overall throughput is increased by allowing a memory read operation to proceed in parallel with the lock logic processing. This eliminates the two step process evident in the prior art where first a lock was requested and granted before the memory read request could be processed. By processing the lock and memory read operations in parallel, the requested data is made available to the requesting processor independent of the arrival of the lock-granted signal.

Third, deadlock situations are avoided by monitoring the status of each processor which makes storage lock-requests. If a processor becomes inoperative during the time which it has a storage location locked, the storage location which is locked by the inoperative processor is released and another processor waiting for the locked storage location is granted the lock.

The foregoing and various other aspects of the invention will become apparent from a consideration of the Drawings and the following detailed Description of the Preferred Embodiment of the invention.

DESCRIPTION OF THE PREFERRED EMBODIMENT

Figure 1:
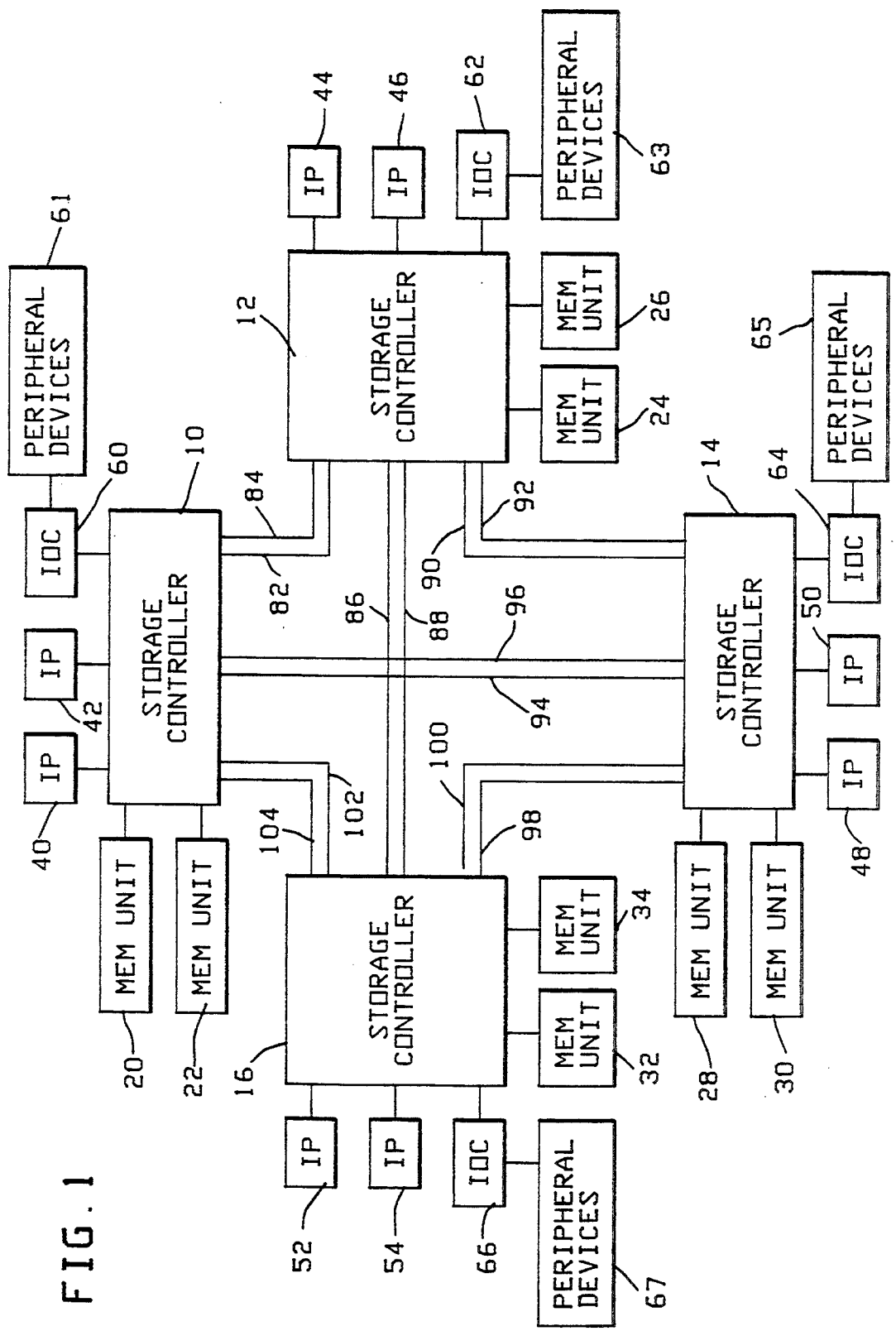
FIG. 1 is a block diagram of the overall data processing system in which present invention is utilized.

FIG. 1 is a block diagram of the overall data processing system in which the present invention is utilized. The system show is that of the 2200/900 Series data processing system, commercially available from Unisys Corporation. The fully populated system consists of a configuration built around four Storage Controllers 10, 12, 14, and 16, respectively. Storage Controller 10 is exemplary of the other Storage Controllers 12, 14, and 16 and will be used in the following general discussion. It should be understood that the general operation of Storage Controllers 12, 14, and 16 can be understood from the following discussion of Storage Controller 10.

Storage Controller 10 controls access to two locally associated addressable Memory Units 20 and 22. Each addressable Memory Unit 20 and 22 contains addressable memory space for purposes of storing data and computer instructions. Similarly, Storage Controller 12 controls access to locally associated addressable Memory Units 24 and 26, Storage Controller 14 controls access to locally associated addressable Memory Units 28 and 30, and Storage Controller 16 controls access to its locally associated addressable Memory Units 32 and 34.

Two local Instruction Processors, IP 40 and IP 42 are directly coupled to the Storage Controller 10. The Instruction Processors 40 and 42 can send requests for access to specified locations in addressable memory to the Storage Controller 10. If the address requested is contained within local addressable Memory Unit 20 or Memory Unit 22 controlled by Storage Controller 10, the request is processed locally. Otherwise, the memory request is sent by Storage Controller 10 to the appropriate remote Storage Controller 12, 14, or 16 depending upon the particular address requested. The Storage Controllers 12, 14, and 16 are also shown with their local directly coupled Instruction Processors IP 44 and IP 46, IP 48 and IP 50, and IP 52 and IP 54.

Storage Controller 10 also has an Input Output Controller, IOC 60. IOC 60 controls the transfer of data between peripheral data storage devices, such as tapes and disks, show collectively as Peripheral Devices 61, and Storage Controller 10. IOC 62, IOC 64, and IOC 66 are similarly coupled to the respective Storage Controllers 12, 14, and 16, and are coupled to associated Peripheral Devices 63, 65, and 67 respectively.

Storage Controller 10 is directly coupled (not bussed) to each of Storage Controllers 12, 14, and 16. Coupling 82 represents the direct coupling for sending memory and lock requests from Storage Controller 10 to Storage Controller 12, and Coupling 84 represents the direct coupling for sending memory and lock requests from Storage Controller 12 to Storage Controller 10. The remaining inter-couplings are similar in function and are shown by lines 86, 88, 90, 92, 94, 96, 98, 100, 102 and 104.

Figure 2:
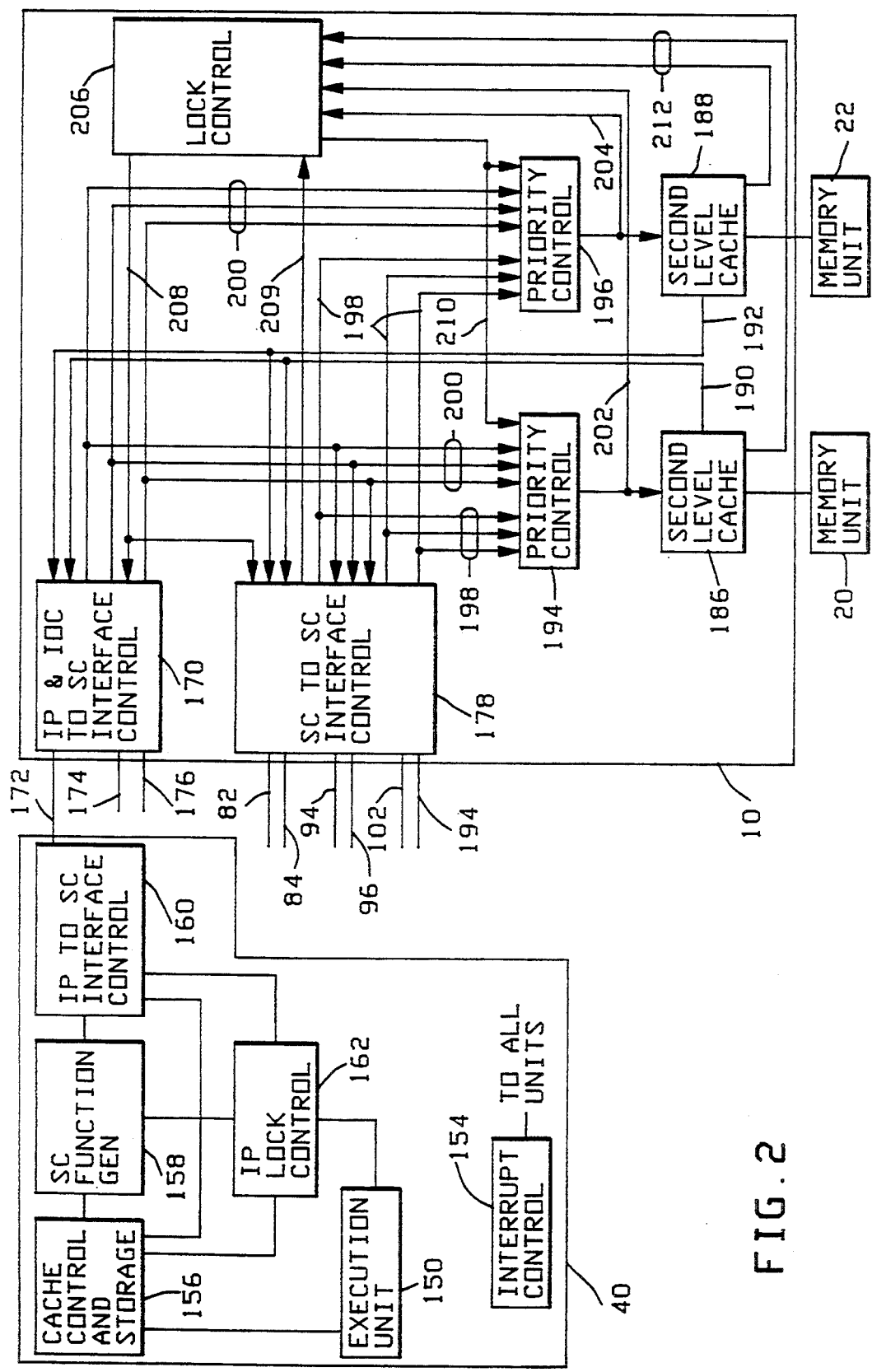
FIG. 2 is a block diagram of an Instruction Processor for executing instructions which is coupled to a Storage Controller.

FIG. 2 is a block diagram of an Instruction Processor for executing instructions which is coupled to a Storage Controller. IP 40 provides instruction execution for programs stored in Memory Units 20 and 30. Each IP is functional to call instructions from the addressable Memory Units 20, 22, 24, 26, 28, 30, 32, and 34, execute the instructions, and, in general, do data manipulation. The Instruction Processor 40 has an Execution Unit 150 for executing instructions retrieved from memory and manipulating data. An Interrupt Control 154 is coupled to all units within the Instruction Processor 40 for signalling interrupts due to error detection and other preemption conditions.

The Instruction Processor 40 has a Cache Control and Storage 156 consisting of an instruction cache and an operand cache for providing high speed access to the data stored within. The Cache Control 156 is coupled to a Storage Controller Function Generator 158 which generates various request functions to the Storage Controller 10. An example case is where the Execution Unit 150 seeks access to a memory location via Cache Control 156. If Cache Control 156 determines that the requested address is not available in the cache storage, a signal is provided to the SC (Storage Controller) Function Generator 158 indicating that the requested address is not available in the cache storage and must be retrieved. The operation code (also referred to as a request) generated by the SC Function Generator 158 is forwarded to the IP-to-SC Interface Control 160 to be transmitted to the coupled Storage Controller 10. The operation code contains an address code portion indicating the desired address and a function code portion indicating the desired operation, such as a lock request.

IP Lock Control 162 coordinates the processing of storage lock instructions. The Instruction Processor Lock Control 162 signals the Execution Unit 150 when exclusive control of the requested location has been granted by Lock Control 206 and coordinates the release of the locked memory location when execution of the special instruction is complete.

The main function of Storage Controller 10 is to manage the data traffic of the system. Requests for Memory Units 20 and 22 are processed within the Storage Controller 10. Requests for any of the other addressable Memory Units 24 and 26, 28 and 30, and 32 and 34 (shown in FIG. 1) are routed to the appropriate Storage Controller 12, 14, or 16. IP 40, IP 42, and IOC 60 will be referred to as "local requesters" when they request access to Memory Units 20 or 22 which are controlled by the Storage Controller 10 to which the requesters are directly coupled. IP 40, IP 42, and IOC 60 will be referred to as "remote requesters" when they request access to Memory Units 24 and 26, 28 and 30, and 32 and 34 which are controlled by a Storage Controllers 12, 14, and 16 respectively, other than the Storage Controller 10 to which the requesters are directly coupled.

Within Storage Controller 10 is the IP (Instruction Processor) and IOC (Input/Output Controller)-to-SC (Storage Controller) Interface Control 170. This logic controls the communication between the Storage Controller 10 and each directly coupled (not bussed) IP 40, IP 42 and IOC 60. Line 172 represents the coupling between Storage Controller 10 and IP 40; line 174 represents the coupling between Storage Controller 10 and IP 42 (not shown); and line 176 couples Storage Controller 10 to IOC 60 (not shown).

Storage Controller 10 also has a Storage Controller (SC) to SC Interface Control 178 for controlling communications between Storage Controller 10 and Storage Controllers 12, 14, and 16. The 2200/900 Series data processing system, in which the present invention is implemented, has possible configurations consisting of one to four Storage Controllers. Lines 82 and 84, 94 and 96, and 102 and 104 represent the coupling between Storage Controller 10 and Storage Controllers 12, 14, and 16 respectively. The coupling between each pair of Storage Controllers is direct, not bussed, and has separate lines for requests received by a Storage Controller and requests sent from a Storage Controller.

Storage Controller 10 also provides caching of data stored in the addressable Memory Units 20 and 22. The Storage Controller 10 reduces access time to data stored in Memory Units 20 and 22 by caching data from the Memory Units in Second Level Caches 186 and 188. Second Level Cache 186 buffers data for Memory Unit 20 and Second Level Cache 188 buffers data for Memory Unit 22. When Second Level Cache 186 detects that the requested memory address is present in its buffer storage, that data is returned to the requester via line 190. In the case of a local requester, the data passes to the local requester via the IP and IOC-to-SC Interface Control 170; in the case of a remote requester, the data passes to the Storage Controller controlling the remote requester via the SC-to-SC Interface Control 178. Similarly, data returned from Second Level Cache 188 passes via line 192.

Priority Controls 194 and 196 select a single memory request to present to the corresponding Second Level Caches 186 and 188. Because memory requests can come from the local IPs, 40 and 42, the local IOC 60, and remote Storage Controllers 12, 14, and 16 simultaneously, a priority mechanism is necessary to select one of the multiple requesters for which the memory access is directed to the respective Second Level Cache. Lines 198 are input requests from the SC-to-SC Interface Control 178 to the Priority Controls 194 and 196; they represent the requests made by the remote requesters coupled to Storage Controllers 12, 14, and 16. Lines 200 are inputs from the IP and IOC-to-SC Interface Control 170 to the Priority Controls 194 and 196; and they represent the requests made by the local requesters: IP 40, IP 42, and IOC 60.

When a memory request is selected by Priority Controls 194 and 196 for processing by the Second Level Caches 186 and 188, the requests are also forwarded via lines 202 and 204 to Lock Control 206. Lock Control 206 coordinates the requests for exclusive lock access to memory addresses within the domain of Memory Units 20 and 22. A request signal indicating that a processor desires exclusive lock access to a address in memory is called a "Lock-Request." As a memory request is processed by the Second Level Caches 186 and 188, the request is simultaneously processed by Lock Control 206. When Lock Control 206 determines that it is appropriate for a requester to have exclusive lock access to a memory location, a Lock-Granted signal is sent to the requester via line 208 and the Interface Controls 170 and 178. Line 209 is input from the SC-to-SC Interface Control 178 to the Lock Control 206 line 209 contains Lock-Granted signals received at Storage Controller 10 from Storage Controllers 12, 14, and 16; lines 210 and 212 provide timing signals between the Lock Control 206, Priority Controls 194 and 196, and Second Level Caches 186 and 188 for ensuring that buffers within the Lock Control 206 are not written to before the Lock-Requests are processed. The details concerning these timing signals will be described in greater detail with FIG. 4.

Figure 3:
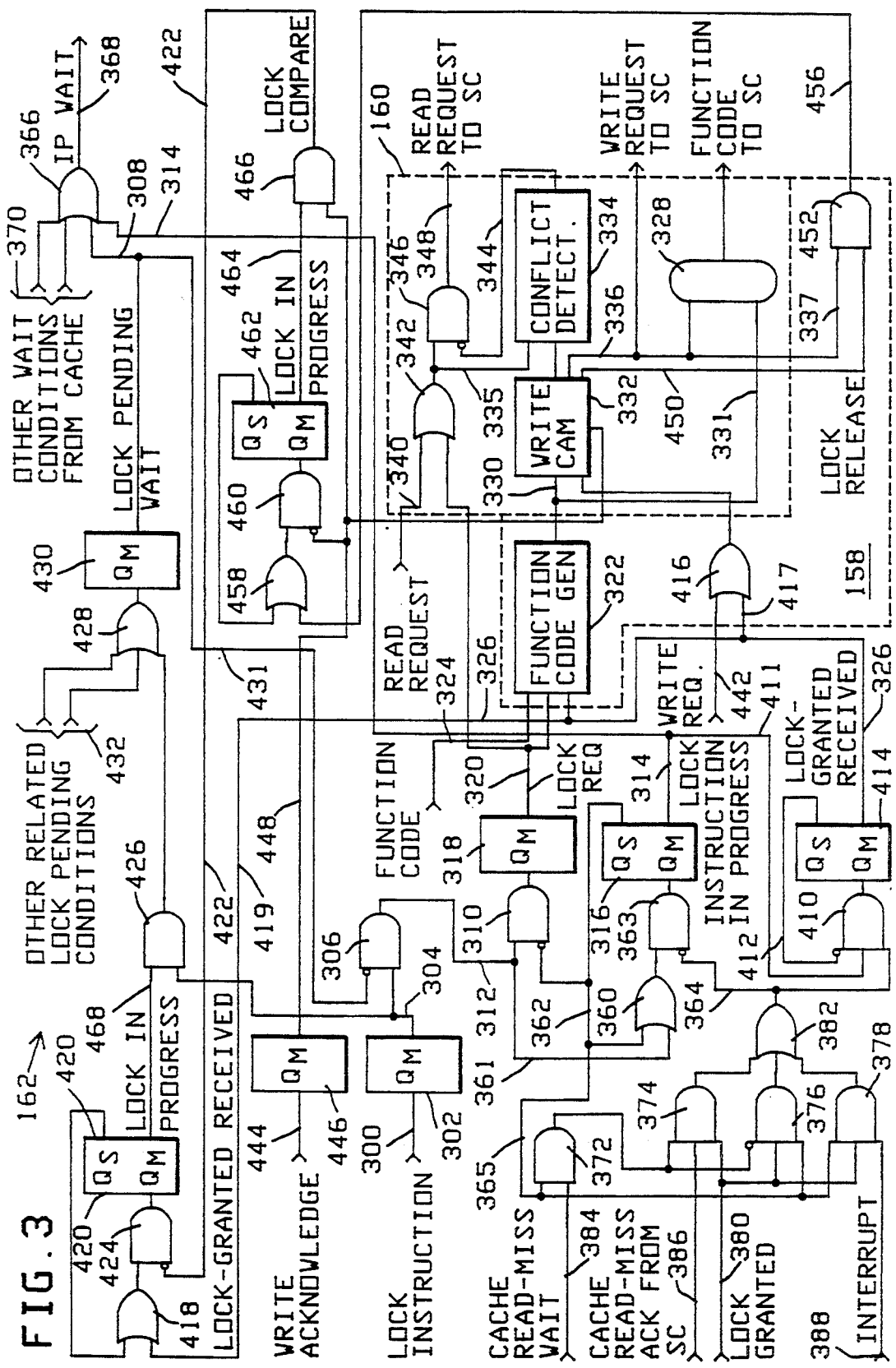
FIG. 3 is a logic diagram of the IP Lock Control for coordination of lock processing.

FIG. 3 is a more detailed logic diagram of the IP Lock Control 162 (Shown in FIG. 2) for coordination of lock processing. Control can be traced by beginning with the IP Lock Instruction Signal 300. When IP 40 decodes an instruction and detects an instruction for which a storage lock is necessary, the Lock Instruction Signal 300 is captured by Register 302. The output signal is passed over line 304 from Register 302 and is supplied to AND Gate 306. If there is no Lock-Pending Wait at Register 430, the inverted Lock Pending Wait Signal on line 308 and the IP Lock Instruction on line 304 satisfy AND Gate 306. The output of AND Gate 306 is routed to AND Gate 310 via Signal line 312. When an active Signal line 312 is present and the Slave Lock Instruction In Progress Signal 314 from Register 316 is not active on line 315, Register 318 is set from the output of AND gate 310. Register 318 then supplies the Lock Request Signal on line 320 to Function Code Generator Logic 322.

Function Code Generator 322 takes the Lock Request Signal 320, a Function Code on line 324 from the Cache Control 156 (Shown in FIG. 2), and the Lock Granted Received Signal 326 as input, and generates a function code request which is routed to the Selector Circuit 328 via line 331. Function Code line 324 is a set of signals sent from the Cache Control 156 (Shown in FIG. 2) to the Storage Controller Function Generator 158 for the generation of a request to send to the Storage Controller 10 (Shown in FIG. 2). One example Function Code sent over line 324 would be where the Cache Control 156 detects that the address specified by a read instruction is not present in its cache memory and sends a Read Function Code along with the requested address. A second example is where the Cache Control performs a store operation resulting in a store-through cache operation, and thereafter sends a Write Function Code to the Function Code Generator 322.

For the purposes of this invention Function Code Generator 322 generates one of three function code requests on lines 330 and 331. Each type of request is defined below:

a) Read with Lock—A Read with Lock request is sent on Line 330 when the Lock Request Signal is active on line 320 and Function Code 324 indicates that a memory read is necessary. When the proper Storage Controller receives the Read with Lock request, the Lock and Read portions of the function are processed in parallel as described in FIG. 2.

b) NOP-Read with Lock—A No-Operand-Read (NOP-Read) with Lock request is sent on lines 330 and 331 when the Cache Control 156 detects that the address upon which a lock is desired is present in its cache memory and sends a Function Code 324 indicating that a read is not necessary, and the Lock Request Signal on line 320 is active. When the proper Storage Controller receives the NOP-Read with Lock request, the NOP-Read portion is essentially ignored and the Lock portion is sent to Lock Control 206 (see FIG. 2).

c) Write with Lock Release—A Write with Lock Release request is sent on lines 330 and 331 when Lock Granted Received Signal is active on line 326 and the Cache Control 156 has sent a Function Code 324 with an appropriate write function. The Write portion of the request indicates the data that the Second Level Cache 186 or 188 is to store in the Second Level Cache memory or one of Memory Units 20 or 22. The Lock Release portion of the function code indicates that the Lock Control 206 can release the exclusive hold on the specified memory location.

It should be noted that normal Read Requests and Write Requests are also generated in Function Code Generator 322, but for the purpose of this invention, they need not be described.

The Write CAM 332 is the first-in first-out memory with a content addressable memory mechanism. All function codes having a write request pass through Write CAM 332 on a first-in first-out priority scheme. One method for increasing the performance of a processor is to maximize the time the processor performs useful functions and minimize the time the processor spends waiting. In the case of the write-through cache, it can be seen that if all Read and Write Requests are sent to the Storage Controller 10 on a simple first-come-first-served basis, the Instruction Processor 40 may be kept waiting for data where there are Write Requests ahead of the Read Request in the queue. Therefore, the system in which the present invention is used has a "read-priority" scheme to maximize processor utilization. With read-priority, if there are Write Requests already in the Write CAM 332 and a Read Request is sent from Cache Control 156, the Read Request receives priority, unless there is a write/read conflict, and is processed first, effectively keeping the Instruction Processor 40 busy by providing it with data as soon as possible.

While the read-priority scheme ensures that an instruction processor is kept busy, care must be taken to ensure that the proper data is returned from the Storage Controller 10. The specific case where old data could be returned from the Storage Controller 10 in a strict read-priority scheme is where Cache Control first sends a Write Request for a particular address and then sends a Read Request for the same address as that specified in the Write Request. If a strict read-priority scheme was followed, the Read Request would be sent to the Storage Controller 10 before the Write Request, and the data returned would be incorrect because the Write Request would not yet have been processed. To deal with this situation, the Conflict Detection Logic 334 is designed to detect when a Read Request sent to the Write CAM 332 is for the same address as that specified in an outstanding Write Request. Conflict Detection Logic 334 receives an input on signal line 335 from OR Gate 342. OR Gate 342 provides an active signal at its output when either the Read Request Signal is active on line 340 or the Lock Request Signal is active on line 320. If no conflict is detected, the signal provided on line 346 causes AND Gate 346 to provide an active Read Request Signal on line 348 to the Storage Controller 10. If Conflict Detection Logic 334 detects that a Read or Read with Lock Request conflicts with an outstanding Write Request in the Write CAM 332, the signal on line 344 disables AND Gate 346 and allows the outstanding Write Request to be processed first.

Cable 336 from Write CAM 332 carries a function code from the Write CAM to Selector Circuit 328. When a Write Request is selected, the Signal on line 337 signals the Storage Controller 10 that a Write Request is forthcoming. If neither Read Request Signal on line 340 nor Lock Request Signal on line 320 is active, the output of OR Gate 342 is inactive and Conflict Detection Logic 344 will not detect a read/write conflict.

The signal on line 312 from AND Gate 306 is also routed to OR Gate 360 via line 361. When the signal on line 312 is active the output signal from OR Gate 360 is active. AND Gate 363 takes the inverted signal from line 364 and the output signal from OR Gate 360, and, when both are active, Register 316 is set to indicate that a Lock Request is being processed. The output of Register 316 is fed back to input of OR Gate 360 via line 362, and the Register 316 maintains Lock Instruction In Progress signal on line 314 until the signal on line 364 becomes active. The Lock Instruction In Progress signal on line 314 from Register 316 is also routed to OR Gate 366 which issues an IP Wait signal on line 368. The IP Wait signal on line 368 is returned to the Execution Unit 150 (Shown in FIG. 2) to indicate to the Execution Unit that it should suspend activities until the signal is removed. It should be noted that the IP Wait signal on line 368 can be active when either the signal on line 314 is active, the Lock Pending Wait signal on line 308 is active, or the Cache Control 156 (see FIG. 2) establishes Other Wait Conditions 370. Other Wait Conditions 370 are shown to merely illustrate that there could be other signals routed to OR Gate 366 for the purpose of activating the IP Wait signal on line 368. Further explanation of these signals is unnecessary for the purpose of understanding this invention.

The Slave Lock In Progress signal on line 365 is routed to AND Gates 372, 376, and 378. Until an active Lock Granted signal on line 380 is returned from the Storage Controller 10, none of the outputs from AND Gates 374, 376, and 378 will be active, thereby driving the output Signal 364 of OR Gate 382 to inactive. The signal in line 364 is inverted and provided as input to AND Gate 362 for resetting the Register 316 as described above.

Once the Storage Controller 10 (Shown in FIG. 2) has processed the Lock Request (described further in FIGS. 4 and 5), a Lock-Granted signal on line 380 is returned to the IP Lock Control 162 (See FIG. 2). The Lock-Granted signal on line 380 is combined with the Slave Lock Instruction In Progress signal on line 365, Cache Read Miss Wait signal on line 384, Cache Read Miss Acknowledge signal on line 386 from the Second Level Cache 186 or 188, and Interrupt signal on line 388 to change the state of the IP Lock Control Logic 162.

The Cache Read Miss Wait signal on line 384 is active when the Cache Control 156 detects that a requested address is not in its cache memory; the Cache Read Miss Acknowledge signal on line 386 is active when the Cache Control has received the acknowledgement from the Second Level Cache 186 or 188 indicating that data is forthcoming. When any one of the outputs of AND Gates 374, 376, or 378 is active, the signal line 364 from OR Gate 382 will be active. The inverted signal on line 364 is routed to AND Gate 362 and will effectively clear Register 316 and drive Lock Instruction In Progress on signal line 314 to an inactive state. If the Lock Instruction In Progress on signal line 314 is what caused the IP Wait signal on line 368 to be active, when the signal on line 314 goes inactive, so will the IP Wait signal on line 368.

AND Gate 410 receives input signals from the Lock Instruction In Progress on signal line 411, signal line 364, and the inverted slave output signal on line 412 from Register 414. Register 414 remains in a cleared state until both the signal on line 411 and the signal on line 364 are active, and AND Gate 410 and Register 414 effectively generate Lock Granted Received signal on line 326. The master output, Qm, of Register 414 represents the Lock Granted Received signal on line 326, and is routed to OR Gate 416 via line 417, Function Code Generator 322 on line 326, and OR Gate 418 on line 419.

Register 420 is set when the Instruction Processor has received a Lock-Granted signal on line 380 and is performing the specified operations on the locked memory location. In particular, Register 420 is set when the Lock-Granted Received signal on line 419 is active, and Register 420 remains set until the Lock Complete signal on line 422 is active. Note that the Lock Complete signal on line 422 is asserted when all processing, including that in the Storage Controller 10, associated with the address locked by the Instruction Processor 40 is complete. The Lock-Granted Received signal on line 419 and the slave output of Register 420 are routed to OR Gate 418. The output of OR Gate 420 and the inverted Lock Complete signal on line 422 are provided to AND Gate 424 whose output is used to set and clear Register 420.

The logic provided by AND Gate 426 and OR Gate 428 is used to set Register 430. As shown, Register 430 establishes the Lock Pending Wait signal on line 308 which is routed to OR Gate 366. The significance of Register 430 is that any subsequent Lock type instructions will be held until the current Lock type instruction is complete. This is shown in the logic where the Lock Pending Wait signal is also routed via line 431 to AND Gate 306 and inverted. The signal on line 312 is activated to trigger lock processing when the Lock Pending Wait signal on line 308 is not activated and the signal on line 304 is active, namely, when there currently is not a storage lock instruction being processed and a storage lock instruction is requested. Other Related Lock Pending Conditions 432 are merely shown to illustrate that there could be other signals routed to OR Gate 428 for the purpose of asserting the Lock Pending Wait signal on lines 308 and 431. Further explanation of these signals is unnecessary for the purpose of understanding this invention.

The process of releasing a locked memory location begins with the receipt of a Write Request signal on line 442, which is routed from the Cache Control 156 to OR Gate 416. Along with the Write Request, Cable 324 carries a function code specifying a Write and Lock Release request to the Function Code Generator 322. The function code contains the address, data, and operation to perform.

The Write With Lock Release Function Code received on line 324 is routed to the Function Code Generator Logic 322 upon which the proper function code is generated and routed to the Write CAM 332 and Selector Circuit 328. When the Write With Lock Release request receives priority in the Write CAM, line 336 routes the Write Request portion of the function code to Selector Circuit 328 and the Write Request signal is provided on line 337 is asserted. When the Storage Controller 10 has received the Write Request, the Write Acknowledge signal on line 444 is applied thereby setting Register 446. The output signal on line 448 from Register 446 is routed to the Write CAM 332 through OR Gate 416.

Once the Storage Controller 10 has acknowledged the Write Request, the second part of the Write With Lock Release sequence can be performed, namely, a NOP-Write With Lock Release is sent to the Storage Controller. Upon receipt of the Write Acknowledge, the Write CAM provides the Lock Release signal on line 450 to AND Gate 452; Cable 336 carries the NOP-Write With Lock Release function code to Selector Circuit 328; and the Write Request signal is provided on line 337 along with the NOP-Write With Lock Release function code to the Storage Controller 10. A brief explanation of the reason for sending the Write With Lock Release request to the Storage Controller 10 as two requests follows.

Because the Lock Control 206 (Shown in FIG. 2) and Second Level Caches 194 and 196 within Storage Controller 10 process concurrently, parallel processing of the Write With Lock Release function presents the danger that the Lock Release portion could be completed before the Write portion of the request. If this sequence is allowed, there is a risk that another processor could be waiting to read the data from the address just unlocked. If the Lock Release is completed before the Write portion, the processor requesting the data may have or receive old data as the Write portion of the Write With Lock Release request has not completed. To address this scenario, the Instruction Processor 40 sequences the Write With Lock Release function in two stages: First, the Write Request is sent to the Storage Controller 10. Second, when a Write Acknowledge signal from the Storage Controller 10 has been received on line 444, a NOP-Write with Lock Release function is sent to the Storage Controller 10. Storage Controller 10 interprets the NOP-Write portion of the function code as being a dummy write request whereby the NOP-Write portion is effectively ignored; the Lock Release portion is routed to the Lock Control 206 (Shown in FIG. 2).

Returning to the logic trace, when both the Lock Release signal on line 450 and the Write Request signal on line 337 are active, the AND Gate 452 output signal on line 456 is routed to OR Gate 458. The output of OR Gate 458 is routed to AND Gate 460, which also receives an inverted Write Acknowledge signal on line 448. When the Write Acknowledge signal on line 444 falls to an inactive state, Register 446 is cleared and the signal on line 448 goes inactive. Thus when the signal on line 456 is active and the signal on line 448 is not active, the output of AND Gate 460 goes active and Register 462 is set. The master signal Qm 464 of Register 462 is routed to AND Gate 466 via line 464. When the Storage Controller 10 acknowledges receipt of the NOP-Write With Lock Release function code with an active Write Acknowledge signal on line 444, line 448 is active and routed to AND Gate 466 via line 448 thereby activating the Lock Complete signal on line 422.

The inverted Lock Complete signal on line 422 is supplied to AND Gate 424 whose output when the Lock Complete signal on line 422 is active, is inactive. This clears Register 410 and the Lock In Progress signal on line 468 is thereby forced into an inactive. This in turn drives the output of AND Gate 426 active, and if all Other Lock Pending Conditions 432 are inactive, OR Gate 428 clears Register 430 upon which the Lock Pending Wait signal on line 308 goes inactive. Once the Lock Pending Wait signal on line 308 is cleared, any subsequent lock type instructions can be processed.

Figure 4:
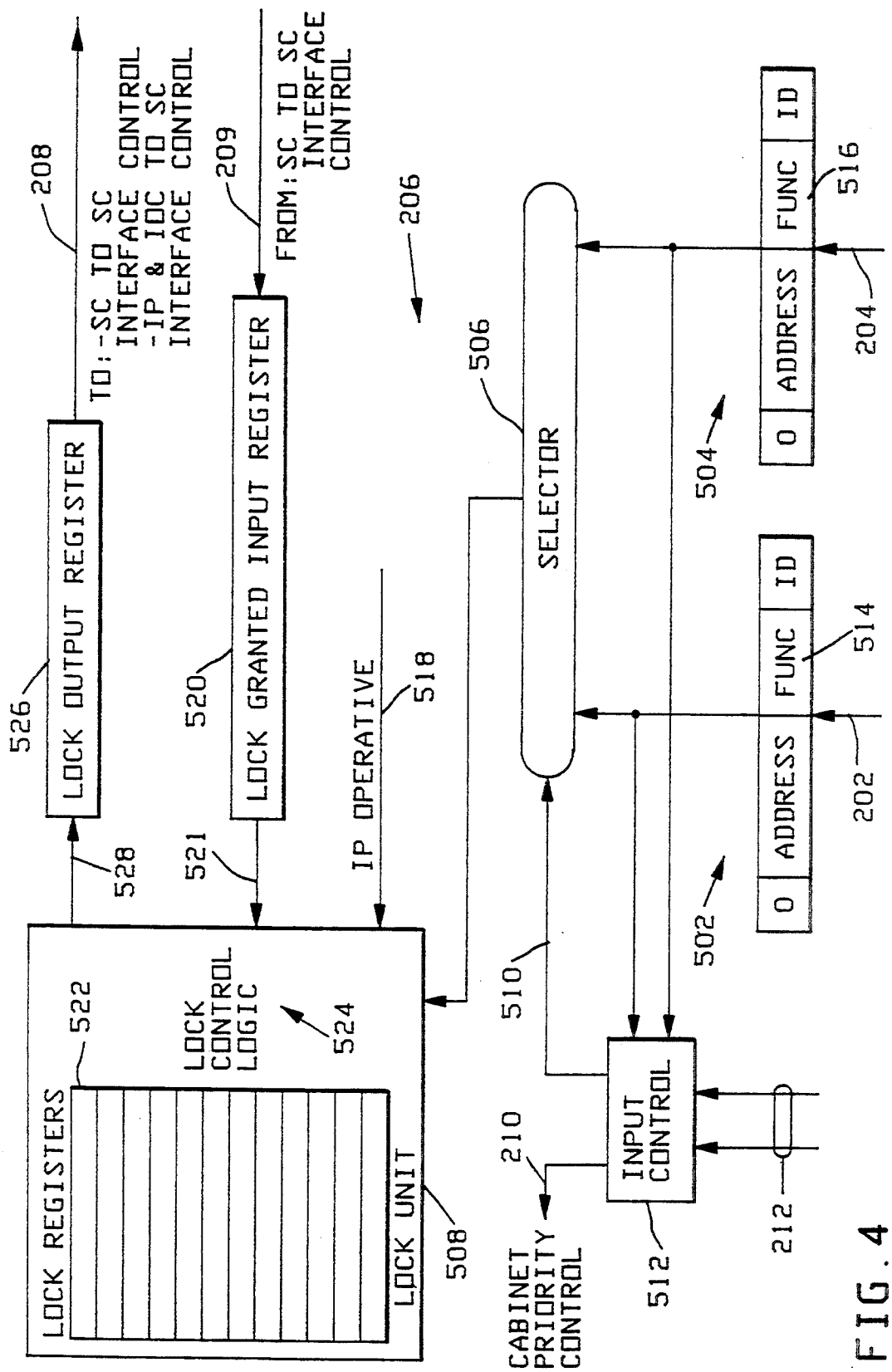
FIG. 4 is a block diagram of the overall Lock Control within a Storage Controller for managing storage lock operations.

FIG. 4 is a block diagram of the overall Lock Control within a Storage Controller for managing storage lock operations. The Lock Control has two Request Registers 502 and 504. The Request Registers 502 and 504 receive input from Priority Controls 194 and 196 (Shown in FIG. 2) respectively. As memory requests are routed to the Second Level Caches 186 and 188, the requests are simultaneously routed to the Request Registers 502 and 504. Processing of Lock Requests proceeds in parallel with processing of the memory request in the Second Level Caches 186 and 188 (see FIG. 2).

Selector 506 selects the contents of either Request Register 502 or Request Register 504 for processing by the Lock Unit 508 based upon the Selector Signal 510 from Input Control 512. Input Control 512 detects Lock Requests and Release Requests as indicated by the Function Portions 514 and 516 of Request Registers 502 and 504. Upon decoding the Function Portions, Input Control 512 generates control signals for the sequencing of the Lock Unit 508.

TAG Request signals on line 212 are active when a request has gained priority to the Second Level Caches 186 and 188. There is a separate signal for each Second Level Cache. When asserted together, these signals indicate that both Second Level Cache 186 and Second Level Cache 188 are processing a simultaneous requests. If Input Control 512 detects that each Function Portion 514 and 516 of Request Registers 502 and 504 contains a Lock Request or a Lock Release Request, the signal on line 510 is active and routed to Selector 506 upon which Selector 506 selects Request Register 502 for processing by the Lock Unit 508. Furthermore, a Cabinet Priority Inhibit signal on line 210 is activated to indicate to Priority Controls 194 and 196 that no new requests should be granted priority to either Second Level Cache 186 or Second Level Cache 188 until the Cabinet Priority Inhibit signal on line 210 goes inactive. This ensures that the requests in Request Registers 502 and 504 are processed before being overwritten with subsequent requests. After the Lock Unit 508 has had time to complete processing of the contents of Request Register 502, Input Control 512 deactivates the signal on line 510 to indicate to Selector 506 that Request Register 504 should be selected for processing by Lock Unit 508. After Lock Unit 508 has had time to process the contents of Request Register 504, the Cabinet Priority Inhibit signal on line 210 is deactivated so that Priority Controls 194 and 196 can resume processing.

Additional inputs to Lock Unit 508 include the IP Operative signal on line 518 and output from the Lock Granted Input Register 520 on line 521. The IP Operative line 518 consists of signals which indicate the status of each IP 40, 42, 44, 46, 48, 50, 52, and 54. An inactive IP Operative signal indicates that the Instruction Processor associated with the signal line is inoperative for further processing. An example would be where the Instruction Processor detects an unrecoverable hardware error and aborts processing.

The Lock Granted Input Register 520 latches Lock Granted signals from the other Storage Controllers 12, 14, and 16 and routes them to Lock Unit 508 where they are routed directly to the Lock Output Register 526 as will be described shortly.

Lock Unit 508 has a set of Lock Registers 522 and Lock Control Logic 524 to manage the contents of the Lock Registers. A Lock Register is provided for each processor in the configuration, wherein each register contains the address for which the processor is requesting a lock or currently has an outstanding lock granted. When Lock Unit 508 generates a Lock Granted signal, the result is made available in Lock Output Register 526 via line 528. Lock Unit 508 is discussed in greater detail with FIG. 5.

Figure 5:
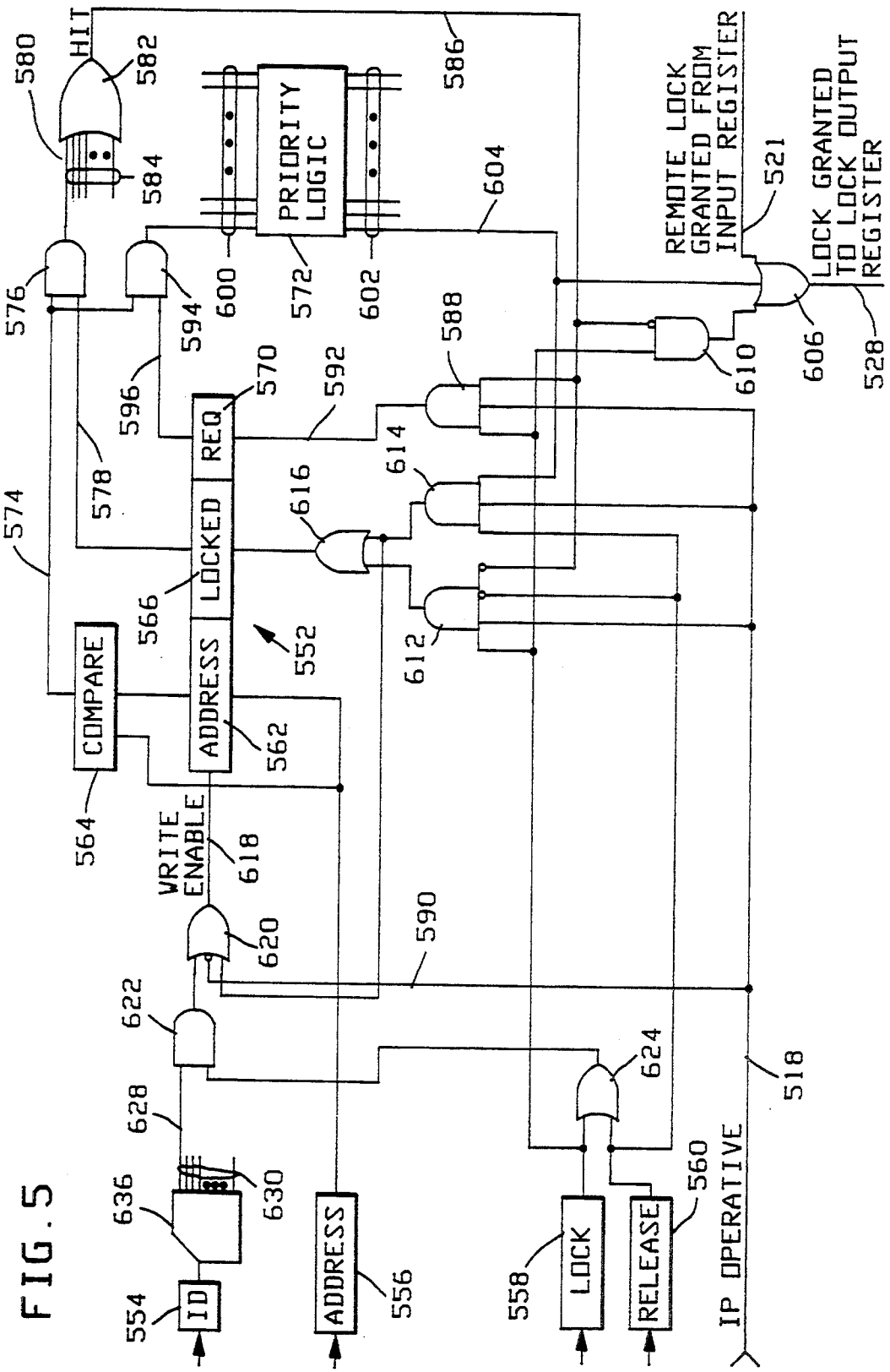
FIG. 5 is a logic diagram for the Lock Control Logic in the Storage Controller and the affected Lock Registers.

FIG. 5 is the logic diagram for the Lock Control Logic and the affected Lock Registers. While the diagram shows only one Lock Register 522, it should be noted that the Lock Register shown is one of a possible plurality. Likewise, most of the logic shown is repeated for each Lock Register with the exceptions noted in the following discussion.

In general, the Lock Unit 508 (See FIG. 4) works as follows: A request containing a processor identifier, an address code, and a function code are presented to the Lock Unit 508. The address code is stored in Address Register 556, the processor identifier is stored in ID Register 554, and the function code is decoded (not shown) and either the Lock Request Register 558 is set or the Release Request Register 560 is set. The Address Register 556 is compared against the Address Portion 562 of Lock Register 552 by Compare Logic 564. The comparison is performed across all Lock Registers 522 simultaneously. If the logic detects that the address code of Address Register 556 is not present in any of the Lock Registers 522 and the Lock Request Register 558 is set, the Locked-Bit Register 566 is set for the appropriate processor and a Lock Granted Signal 528 is routed to the Lock Output Register 526 (Shown in FIG. 4). If the logic detects that the address code of Address Register 556 is present in one or more of Lock Registers 522, lock request is queued by setting the Lock-Requested-Bit Register 570 in the Lock Register 552 associated with the processor identifier of ID Register 554. In either case the Address Register 556 is loaded into the Address Portion 562 of the Lock Register 552.

When the logic detects that the address code in Address Register 556 is present in one or more of the Lock Registers 522 and the Release Request Register 560 is set, Priority Logic 572 is triggered. There is only one Priority Logic 572 present in the Lock Unit 508; it receives inputs from the comparisons done on each of the Lock Registers 522 and selects one of the Lock Registers for which the associated requester will receive a Lock Granted Signal 528. Upon selection for receiving the Lock Granted signal on line 528, the Lock-Requested-Bit Register 570 is cleared and the Locked-Bit Register 566 is set in the Lock Register 552 associated with the requester for which the lock was granted. The type of priority selection algorithm chosen in this embodiment is a Round-Robin scheme. Those skilled in the art will recognize that other algorithms may be substituted.

The following discussion traces the logic flow of FIG. 5. A request which includes a Processor Identifier, an Address, and a Function is presented to the Lock Control Logic 524 (Shown in FIG. 4). The request is stored in a Processor Identifier Register 554, an Address Register 556, a Lock Request Register 558, and a Release Request Register 560.

The contents of the Address Register 556 are compared against the Address 562 stored in the Lock Register 552 by Compare Logic 564. If the contents match, the signal on line 574 is activated and routed to AND Gate 576. AND Gate 576 receives input on signal lines 574 and 578. If both Signals 574 and 578 are active, the signal on line 580 is activated and routed to OR Gate 582. OR Gate 582 receives as input, signals from each of the AND Gates corresponding to AND Gate 576 for each available Lock Register 552. Lines 584 represent these input signals from the logic associated with the other Lock Registers.

If any of signals on lines 584 or line 580 is active, the output of OR Gate 582, namely, the Hit signal on line 586, is active. This signifies that one of the Lock Registers 522 contains an Address 562 which matches the requested Address 556 and currently has the memory location locked, as indicated by Locked-Bit Register 566. Hit Signal 586 is routed to AND Gate 588. AND Gate 588 also receives input signals from Lock Request Register 558 and the IP Operative signal on line 518. For each Lock Register 552, there is a separate IP Operative Line 518 which signals availability of the Instruction Processor which is associated with the particular Lock Register 552. When AND Gate 588 detects that Lock Request Register 558 is set, the IP Operative signal on line 518 is active, and the Hit signal on line 586 is activated, the output signal on line 592 goes active for setting the Lock-Requested-Bit Register 570.

AND Gate 594 receives as input the Compare signal on line 574, and Request Bit signal on line 596 from Lock-Requested-Bit Register 570. If Compare Logic 564 finds that the requested Address 556 matches the Address 562 of Lock Register 552 and thereby asserts Signal 574, and if the Lock-Requested- Bit Register 570 is set, AND Gate 594 asserts its output signal on line 598 and routes it to Priority Logic 572. Similarly lines 600 are inputs from the AND Gates corresponding to AND Gate 594 of the logic associated with the other Lock Registers 522. One or more of these lines 600 and the signal on line 598 may be asserted. Priority Logic 572 selects one of the requesters vis-a-vis the inputs of line 598 and lines 600, and asserts one of lines 602 to indicate that a requester has been given priority. The Priority signal on line 604 is routed to OR Gate 606.

If OR Gate 606 detects an active Priority signal on line 604, the Remote Lock-Granted signal on line 521, or the output of AND Gate 610 is active, the Lock Granted signal on line 528 is activated and routed to the Lock Output Register 526 (Shown in FIG. 4). It should be noted that the output from AND Gate 610 is active when the Lock Request Register 558 is set and the Hit signal on line 586 is inactive.

The Hit signal on line 586 and the Priority signal on line 604 are further routed to AND Gates 612 and 614 for setting or clearing the Locked-Bit Register 566 of Lock Register 552. The output of OR Gate 616 is active when either the output of AND Gate 612 or AND Gate 614 is active. The output from AND Gate 612 is active when the Lock Request Register 558 is set, the IP Operative signal on line 518 is active, the Release Request Register 560 is not set, and Hit signal on line 586 is inactive. The output of AND Gate 614 goes active when the Release Request Register 560 is set, the IP Operative signal on line 518 is active, and the Priority signal on line 604 is active. When these conditions are satisfied, OR Gate 616 activates its output for setting Locked Bit 552.

A Write Enable signal on line 618 is activated for updating the contents of the Lock Register 552. Neither the Address 562, Locked-Bit Register 566, nor the Lock-Requested-Bit Register 570 are changed until the Write Enable signal on line 618 is active. OR Gate 620 activates the Write Enable signal on line 618 when either the IP Operative signal on line 518 is not active, the output of AND Gate 614 is active, or the output of AND Gate 622 is active. AND Gate 614 is described in the previous paragraph.

Turning to AND Gate 622, its output goes active when either the Lock Request Register 558 or the Release Request Register 560 is set as detected by OR Gate 624, and Decoder 626 activates the signal on line 628. Lines 630 emanating from Decoder 626 are routed to the logic associated with each of the other Lock Registers 522 within the Lock Unit 508. Only one of lines 630 or 628 is active, depending on the contents of the Processor Identifier Register 554 as decoded by Decoder 626.

Those skilled in the art will recognize that although the Lock Register 552 is shown as including a Lock-Requested-Bit Register 570, some processors, such as the IOC (Input/Output Controller) 60 (Shown in FIG. 1) should not be idled while waiting for a lock Granted Signal 528. Therefore, the Lock Register 552 associated with an IOC 60 requester has the Address 562 and Locked-Bit Register 566 portions, but no Lock-Requested-Bit Register 570. When the Hit signal on line 586 goes active upon processing a lock request from IOC 60, instead of setting Lock-Requested-Bit Register 570, a lock rejected signal (not shown) is returned to the requester. To obtain the lock, the requester must retry the lock request.

Figure 6:
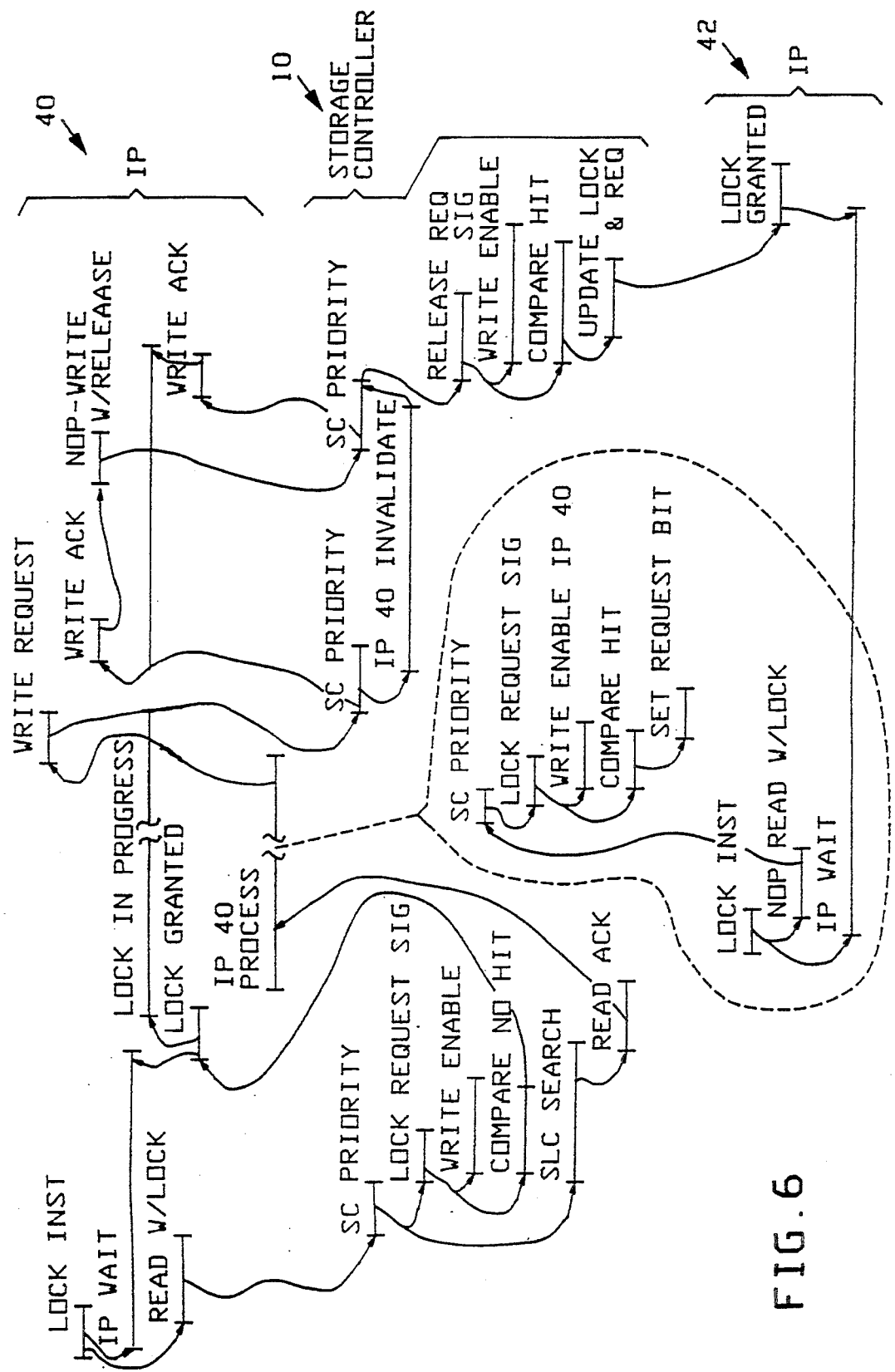
FIG. 6 is a general timing diagram of Lock Request processing with a single Storage Controller and two Instruction Processors.

FIG. 6 is a general timing diagram of Lock Request processing with a single Storage Controller 10 and two requesters, IP 40 and IP 42. In particular, FIG. 6 shows the timing relationships between various stages of processing within a Storage Controller 10, a first Instruction Processor, IP 40, and a second Instruction Processor, IP 42. The horizontal lines indicate the time periods during which the respective processing steps are active, and the lines with arrows are used to indicate the succeeding step(s) which are triggered by a particular processing step. It should be understood that the relative lengths of the horizontal lines in FIG. 6 are shown only to indicate the timing relationships between the processings phases and are not scaled to actual time periods.

Processing begins with an active Lock Instruction signal 808, indicating that IP 40 has decoded an instruction requiring exclusive access to a predetermined address. During the time which IP 40 is waiting for a Lock Granted signal back from the Storage Controller 10, an IP Wait signal 810 is active and IP 40 suspends processing activities. Some time after the Lock Instruction signal 808 has been asserted, a Read With Lock Instruction 812 (an example operation code) is sent to Storage Controller 10. The Read portion of the Read With Lock Instruction is sent when the Cache Control 156 (Shown in FIG. 2) detects that the memory address requested is not present it its storage, and the Lock portion is determined when Execution Unit 150 (Shown in FIG. 2) decodes an instruction and detects a request for exclusive access to the requested address.

After receiving the Read With Lock Instruction, the request is routed to Priority Controls 194 and 196 (Shown in FIG. 2) for Storage Controller 10 processing. The request will receive service from the Priority Control associated with the Memory Unit 20 or 22 (Shown in FIG. 2) having the requested address. SC (Storage Controller) Priority 814 represents the time during which the request is awaiting service. Upon selection for service, a read request along with the specified address is routed to a Second Level Cache (SLC) 186 or 188 (Shown in FIG. 2). An SLC Search 816 is performed to determine whether or not the requested address is in the storage of the Second Level Cache 186 or 188. At substantially the same time as the SLC Search 816 is proceeding, a Lock signal 818 is asserted in Lock Control 206 (Shown in FIG. 2). Lock Request signal 818 causes an activate Write Enable signal 822 for storing appropriate information in the Lock Register 552 (Shown in FIG. 5) associated with Instruction Processor 40. In addition, Lock signal 818 triggers Compare Operation 820 for checking each of the Lock Registers 522 (Shown in FIG. 4) against the address for which the lock is requested. In this example it is assumed that the Compare processing does not find a matching address in the Lock Registers 522 (Shown in FIG. 4). When there is no match detected, a Lock Granted signal 824 is sent to IP 40. When IP 40 receives the Lock Granted signal 824, the IP Wait Condition 810 deactivated, thereby allowing IP 40 to continue its processing activities. In addition, the Lock Granted signal 380 activates the Lock In Progress signal 825. As long as the Lock In Progress signal 424 is active, IP 40 is not allowed to issue another lock request to the Storage Controller 10.

Once the Second Level Cache Search 816 has located the requested address and sent the data to IP 40, a Read Acknowledge signal 826 is activated and routed to IP 40. After receiving the requested data, as indicated by Read Acknowledge signal 826, IP Lock Instruction Processing 828 can continue.

The example of FIG. 6 involves a second requester, IP 42, processing a lock type instruction during the time period during which IP 40 is Processing a Lock Instruction 828. The processing of a lock type instruction by IP 42 during IP Processing 828 is encompassed within the area bound by dashed line 830.

A Lock Instruction signal 832 goes active when a lock type instruction is decoded by IP 42. An active Lock Instruction signal 832 activates the IP Wait signal 834 thereby halting processing by IP 42 until a Lock Granted signal 836 is received. Lock Instruction 832 also triggers processing for sending the necessary function code to the Storage Controller 10. For the IP 42 lock instruction it is assumed that the requested data is present in the cache unit for IP 42; therefore, a NOP-Read With Lock Request 838 is sent to Storage Controller 10. The NOP-Read portion of the function codes indicates to the Storage Controller 10 that a read of data need not be performed.

The NOP-Read With Lock Request is serviced during SC Priority Processing 840. When the request receives priority, a Lock Request signal 842 is activated thereby triggering an active Write Enable signal 844 for the Lock Register 552 (Shown in FIG. 5) associated with IP 42. At substantially the same time, a Compare Operation 846 is performed to check whether any of the Lock Registers 522 (Shown in FIG. 4) has requested or currently has a lock on the address specified by IP 42. In this example it is assumed that IP 42 has requested the same address which IP 40 currently has locked. Therefore, Storage Controller 10 detects a hit in the Compare Operation 846 and Sets a Request Bit Register 848. Processing for IP 42 is then held, as indicated by the IP Wait signal 834, until it receives the Lock Granted signal 836.

Returning to IP 40 Lock Processing 828, it is shown that when complete, the lock release processing begins with a Write Request 862 being sent to the Storage Controller 10. The Write Request is serviced during SC Priority Processing 864. The Storage Controller 10 responds with an active Write Acknowledge signal 865 when it has received the Write Request, upon which a NOP-Write With Lock Release 868 instruction is sent to Storage Controller 10. When the Write Request receives priority, an IP 40 Invalidate signal 866 is activated to inhibit priority for any subsequent write requests made by IP 40. As set forth in the description accompanying FIG. 3, when the locked location is to be modified, the IP 40 will send a write request, address, and data to the SC. This will be followed with a NOP-Write With Lock Release Request 868.

Where the locked location is not modified, the IP 40 simply sends a NOP-Write Request With Lock Release. In the case where IP 40 modifies the locked location, there are two write requests made to the Storage Controller 10. The second write request (NOP-Write Request With Lock Release) will not be allowed priority until the invalidate for the first write request (Write Request 862) has been acknowledged. The reason for this is that any processor having the data from locked location in its local cache must be notified that the current data is invalid before being allowed to access to the locked location. When all invalidate acknowledge signals have been received by Storage Controller 10 (signals not shown for clarity), SC Priority Processing 870 selects the Lock Release Request for processing by Lock Control 206 (Shown in FIG. 2) and activates Write Acknowledge Signal 871. Receipt of the Write Acknowledge Signal 871 deactivates the Lock In Progress Signal 825.

An active Release signal 872 causes an active Write Enable signal 874 for storing appropriate information in the Lock Register 552 (Shown in FIG. 5) associated with IP 42. At substantially the same time, a Compare Operation 876 is done to determine whether any other processors have requested a lock for the address being released.

In this example, IP 42 has requested a lock for the address so Operation 878 entails: selecting IP 42 as having priority for receiving the lock on the requested address; clearing the Locked-Bit Register 566 (Shown in FIG. 5) associated with the Lock Register 552 for IP 40; setting the Locked-Bit Register 566 (Shown in FIG. 5) associated with the Lock Register 552 for IP 42; and clearing the Lock-Requested-Bit Register 570 (Shown in FIG. 5) associated with the Lock Register 552 for IP 42.

After determining that the lock request from IP 42 has priority, an active Lock Granted signal 836 is supplied to IP 42, which in turn deactivates the IP Wait signal 834.

While only one embodiment of the present invention has been described, it should be understood that those skilled in the art will recognize that alternate embodiments exist which fall within the scope and spirit of the claims set forth below.

What is claimed is:

1. An apparatus for coordinating exclusive access to selectable portions of addressable memory in a data processing system having a first storage controller, a second storage controller, a first addressable memory unit coupled to the first storage controller and a second addressable memory unit coupled to the second storage controller, wherein each of the storage controllers controls access to the coupled addressable memory unit and the first storage controller is coupled to the second storage controller, the system further including a first processor and a second processor coupled to the first storage controller, and a third processor coupled to the second storage controller, wherein the first, second, and third processors execute instructions and generate memory access requests to manipulate portions of the addressable memory, whereby the intercoupling of the first and second storage controllers provides access to the second addressable memory unit for the first and second processors and further provides access to the first addressable memory unit for the third processor, the apparatus comprising:

first storage request priority control means disposed within the first storage controller for selecting among memory access requests referencing the first addressable memory unit;

second storage request priority control means disposed within the second storage controller for selecting among memory access requests referencing the second addressable memory unit;

first lock control means disposed within the first storage controller and coupled to said first storage request priority means for coordinating memory access requests for exclusive access to a portion of memory in the first addressable memory unit;

second lock control means disposed within the second storage controller and coupled to said second storage request priority means for coordinating memory access requests for exclusive access to a portion of memory in the second addressable memory unit;

a first set of lock address registers disposed within the first storage controller and coupled to said first lock control means, wherein each one of said lock address registers in said first set stores an address referencing the first addressable memory unit and for which exclusive use is requested by a predetermined one and only one of the first, second, and third processors;

a second set of lock address registers disposed within the second storage controller and coupled to said second lock control means, wherein each one of said lock address registers in said second set stores an address referencing the second addressable memory unit and for which exclusive use is requested by a predetermined one and only one of the first, second, and third processors;

a first set of locked-bit registers disposed within the first storage controller and coupled to said first lock control means, wherein each one of said locked-bit registers in said first set of locked-bit registers indicates whether a predetermined one and only one of said lock address registers in said first set of lock address registers references a portion of addressable memory which is exclusively held;

a second set of locked-bit registers disposed within the second storage controller and coupled to said second lock control means, wherein each one of said locked-bit registers in said second set of locked-bit registers indicates whether a predetermined one and only one of said lock address registers in said second set of lock address registers references a portion of addressable memory which is exclusively held;

a first set of lock-requested-bit registers disposed within the first storage controller and coupled to the first lock control means, wherein each one of said lock-requested-bit registers in said first set of lock-request-bit registers indicates whether a predetermined one and only one of said lock address registers in said first set of lock address registers references a portion of addressable memory for which exclusive access is requested;

a second set of lock-requested-bit registers disposed within the second storage controller and coupled to the second lock control means, wherein each one of said lock-requested-bit registers in said second set of lock-requested-bit registers indicates whether a predetermined one and only one of said lock address registers in said second set of lock address registers references a portion of addressable memory for which exclusive access is requested;

first lock priority control means disposed within the first storage controller and coupled to the first lock control means for selecting memory access requests for exclusive access to a portion of memory in the first addressable memory unit, for sending a first lock granted signal to the first processor when exclusive access to a portion of addressable memory is granted to tile first processor, for sending a second lock granted signal to the second processor when exclusive access to a portion of addressable memory is granted to the second processor, for sending a third lock granted signal to the third processor when exclusive access to a portion of addressable memory is granted to the third processor, and for sending a fourth lock granted signal to the fourth processor when exclusive access to a portion of addressable memory is granted to the fourth processor; and second lock priority control means disposed within the second storage controller and coupled to the second lock control means for selecting memory access requests for exclusive access to a portion of memory in the second addressable memory unit, for sending a first lock granted signal to the first processor when exclusive access to a portion of addressable memory is granted to the first processor, for sending a second lock granted signal to the second processor when exclusive access to a portion of addressable memory is granted to the second processor, for sending a third lock granted signal to the third processor when exclusive access to a portion of addressable memory is granted to the third processor, and for sending a fourth lock granted signal to the fourth processor when exclusive access to a portion of addressable memory is granted to the fourth processor.

2. The apparatus of claim 1, wherein the memory access request include a read-with-lock request and said read-with-lock request includes an address code that indicates the portion of addressable memory to read and a lock code that indicates that exclusive access to the portion of addressable memory referenced by said address code is requested;

the apparatus further including first initiation means disposed within the first storage controller and coupled to said first storage request priority control means for initiating a read from the first addressable memory unit of the portion of addressable memory referenced by said address code, before said first lock granted signal is sent, before said second lock granted signal is sent, before said third lock granted signal is sent, and before said fourth lock granted signal is sent; and second initiation means disposed within the second storage controller and coupled to said second storage request priority control means for initiating a read from the second addressable memory unit of the portion of addressable memory referenced by said address code, before said first lock granted is sent, before said second lock granted signal is sent, before said third lock granted signal is sent, and before said fourth lock granted signal is sent.

3. The apparatus of claim 1, further including:

first detection means disposed in said first lock control means for detecting when the first processor is inoperative, detecting when the second processor is inoperative, detecting when the third processor is inoperative, and detecting when the fourth processor is inoperative, clearing said first locked-bit register when the first processor is inoperative, clearing said second lock-bit register when the second processor is inoperative, clearing said third lock-bit register when the third processor is inoperative, and clearing said fourth lock-bit register when the fourth processor is inoperative, wherein the first processor is prohibited from retaining access to said portion of addressable memory if it is inoperative, the second processor is prohibited from retaining access to said portion of addressable memory if it is inoperative, the third processor is prohibited from retaining access to said portion of addressable memory if it is inoperative, and the fourth processor is prohibited from retaining access to said portion of addressable memory if it is inoperative; and second detection means disposed in said second lock control means for detecting when the first processor is inoperative, detecting when the second processor is inoperative, detecting when the third processor is inoperative, and detecting when the fourth processor is inoperative, clearing said first locked-bit register when the first processor is inoperative, clearing said second lock-bit register when the second processor is inoperative, clearing said third lock-bit register when the third processor is inoperative, wherein the first processor is prohibited from retaining access to said portion of addressable memory if it is inoperative, the second processor is prohibited from retaining access to said portion of addressable memory if it is inoperative, the third processor is prohibited from retaining access to said portion of addressable memory if it is inoperative, and the fourth processor is prohibited from retaining access to said portion of addressable memory if it is inoperative.

4. An apparatus for coordinating exclusive access to selectable portions of an addressable memory in a data processing system having a storage controller for controlling access to the addressable memory and a first processor and a second processor coupled to the storage controller for executing instructions and processing data stored in the addressable memory, the apparatus comprising:

storage request priority control means disposed within the storage controller for receiving requests from the first and second processors and selecting one of the processors to receive access to the addressable memory unit;

lock control means coupled to said storage request priority control means for coordinating requests by the first and second processors for exclusive access to the selectable portions of the addressable memory unit, for sending a first lock granted signal to the first processor when exclusive access to a portion of addressable memory is granted to the first processor, and for sending a second lock granted signal to the second processor when exclusive access to a portion of addressable memory is granted to the second processor;

a first lock address register coupled to said lock control means, for storing an address for which exclusive use is requested by the first processor;

a second lock address register coupled to said lock control means for storing an address for which exclusive use is requested by the first processor;

a first locked-bit register coupled to said lock control means, for indicating when said lock control means has granted exclusive access to a portion of addressable memory to the first processor;

a second locked-bit register coupled to said lock control means for indicating when said lock control means has granted exclusive access to a portion of addressable memory to the second processor;

a first lock-requested-bit register coupled to said lock control means with for indicating whether the first processor awaits exclusive access to the portion of addressable memory referenced by said first address register; and a second lock-requested-bit register coupled to said lock control means for indicating whether the second processor awaits exclusive access to the portion of addressable memory referenced by said second lock address register 5. The apparatus of claim 4, further comprising initiation means coupled to said storage request priority control means for initiating a read request for a selected address before said first lock granted signal is sent and before said second lock granted signal is sent.

6. The apparatus of claim 4, wherein said lock control means further includes processor-inoperative detection means for detecting when the first processor is inoperative, detecting when the second processor is inoperative, clearing said first locked-bit register when the first processor is inoperative, and clearing said second lock-bit register when the second processor is inoperative, wherein the first processor is prohibited from retaining access to said portion of addressable memory if it is inoperative and the second processor is prohibited from retaining access to said portion of addressable memory if it is inoperative.

7. A method for granting exclusive access to a selectable portion of an addressable memory to a processor in a data processing system having a plurality of directly intercoupled storage controllers for controlling access to the addressable memory, and a plurality of processors for processing instructions and data stored in the addressable memory, wherein predetermined ones of the processors are directly coupled to predetermined ones of the storage controllers, and each storage controller controls access to a directly coupled addressable memory unit, whereby each processor, through the storage controller to which a processor is directly coupled, has access to addressable memory units controlled by the other storage controllers, each of the storage controllers further including a plurality of lock address registers, a plurality of locked-bit registers, and a plurality of lock-requested-bit registers, wherein each of the lock address registers within a storage controller is dedicated to storing an address code from one and only one of the processors, each of the locked-bit registers is dedicated to storing the status of one and only one of the address codes in the lock address registers, and each of the lock-requested-bit registers is dedicated to storing the status of one and only one of the address codes in the lock address registers, the method comprising the steps of:
- transmitting a lock request and an address code from a first processor to a first storage controller, wherein said address code specifies a portion of the addressable memory to which said first processor requires exclusive access, and said lock request specifies a request for exclusive access to said portion of addressable memory;
- prohibiting said first processor from processing said portion of addressable memory until a first lock granted signal is received by said first processor;
- sending said lock request and said address code from said first storage controller to a destination storage controller, wherein said destination storage controller controls access to said portion of addressable memory referenced by said address code;
- storing said address code in a first lock address register at said destination storage controller;
- testing whether said address code matches the contents of any of the plurality of lock address registers at said destination storage controller other than said first lock address register;
- setting a first locked-bit register corresponding to said first lock address register if said address code does not match the contents of any of the plurality of lock address registers at said destination storage controller other than said first lock address register;
- setting a first lock-requested-bit register corresponding to said first lock address register if said address code matches the contents of any of the plurality of lock address registers at said destination controller other than said first lock address register;
- sending said first lock granted signal from said destination storage controller to said first storage controller when said first locked-bit register is set;
- sending said first lock granted signal from said first storage controller to said first processor;
- processing said portion of addressable memory at said first processor;
- transmitting a lock release request from said first processor to said first storage controller when said first processor has completed processing on said portion of addressable memory, wherein said lock release request indicates that said first processor no longer requires exclusive access to said portion of the addressable memory;
- transmitting said lock release request from said first storage controller to said destination storage controller;
- clearing said first locked-bit register upon receipt of said lock release request;
- selecting at said destination storage controller a second lock address register whose contents matches said first register and whose corresponding lock-requested-bit register is set when said lock release request is received by said destination storage controller;
- setting at said destination storage controller a second locked-bit register corresponding to said second lock address register to indicate that said second processor has exclusive access to said portion of addressable memory;

sending a second lock granted signal from said first storage controller to said second processor; and
processing said portion of addressable memory at said second processor.

8. The method of claim 7, further comprising the step of initiating a read of said portion of addressable memory before said testing step is complete; and
returning said portion of addressable memory to said first processor independent of whether said portion of addressable memory is locked by another of the plurality of processors.

9. The method of claim 7, further comprising the steps of:
comprising the steps of:
detecting an inoperative processor at said destination storage controller;
clearing a third locked-bit register corresponding to a third lock address register which has an address code that was transmitted with a lock request by said inoperative processor;
selecting a fourth lock address register whose contents matches an address code which was transmitted with a lock request by said inoperative processor;
setting a fourth locked-bit register corresponding to said fourth lock address register;
sending a third lock granted signal from said destination storage controller to said fourth processor; and
processing said portion of addressable memory at said fourth processor.

10. A method for granting exclusive access to a selectable portion of an addressable memory to a processor in a data processing system having a storage controller for controlling access to the addressable memory, and a plurality of processors for processing instructions and data stored in the addressable memory, the method comprising the steps of:
transmitting an operation code from a first processor to a storage controller, wherein said operation code specifies a portion of the addressable memory to which said first processor requires exclusive access and a first lock request for exclusive access to said portion of addressable memory;
prohibiting said first processor from processing said portion of addressable memory until a lock granted signal is received from the storage controller;
testing whether said portion of addressable memory is locked by another of the plurality of processors;
initiating a read of said portion of addressable memory before said testing step is complete;
returning said portion of addressable memory to said first processor independent of whether said portion of addressable memory is locked by another of the plurality of processors;
locking said portion of addressable memory if said portion of addressable memory is not already locked by one of the plurality of processors;
enqueuing said first lock request in a queue of lock requests if said portion of addressable memory is already locked by one of the plurality of processors;
sending said lock granted signal from the storage controller to said first processor when said d portion of addressable memory has been loked;
processing said portion of addressable memory at said first processor;
selecting a second lock request from said queue of lock requests when a lock release request is received from the first processor by the storage controller;

granting exclusive access to said portion of addressable memory to a second processor that transmitted said second lock request.

11. The method of claim 10, further comprising the steps of:

detecting an inoperative processor;

unlocking said portion of addressable memory locked by said inoperative processor; and selecting a third lock request from said queue of lock requests when said inoperative processor is detected;

granting exclusive access to said portion of addressable memory to a third processor that transmitted said third lock request.

12. A method for granting exclusive access to a selectable portion of an addressable memory to a processor in a data processing system having a storage controller for controlling access to the addressable memory, and a plurality of processors for processing instructions and data stored in the addressable memory, the storage controller further including a plurality of lock address registers, a plurality of locked-bit registers, and a plurality of lock-requested-bit registers, wherein each of the lock address registers is dedicated to storing an address code from one and only one of the processors, each of the locked-bit registers is dedicated to storing the status of one and only one of the address codes in the lock address registers, and each of the lock-requested-bit registers is dedicated to storing the status of one and only one of the address codes in the lock address registers, the method comprising the steps of:

transmitting a lock request and an address code from a first processor to a storage controller, wherein said address code specifies a portion of the addressable memory to which said first processor requires exclusive access, and said lock request specifies a request for exclusive access on said portion of addressable memory;

prohibiting said first processor from processing said portion of addressable memory until a first lock granted signal is received by said first processor from the storage controller;

storing said address code in a first lock address register;

testing whether said address code matches the contents of any of the plurality of address registers other than said first lock address register;

setting a first locked-bit register corresponding to said first lock address register if said address code did not match the contents of any of the plurality of lock address registers other than the first lock address register;

setting a first lock-requested-bit register corresponding to said first lock address register if said address code matches the contents of any of the plurality of lock address registers other than the first lock address register;

sending said first lock granted signal from the storage controller to said first processor when said first locked-bit register is set;

processing said portion of addressable memory at said first processor;

transmitting a lock release request from said first processor to the storage controller, wherein said lock release request indicates that said first processor no longer requires exclusive access to said portion of addressable memory;

clearing said first locked-bit register when said lock release request is received by the storage controller;

selecting a second lock address register whose contents matches said address code and whose corresponding lock-requested-bit register is set, when said lock release request is received by the storage controller;

granting exclusive access to a second processor that transmitted said second lock request; and setting a second locked-bit register corresponding to said second lock address register to indicate that said second processor has exclusive access to said portion of addressable memory.

13. The method of claim 12, further comprising the step of initiating a read said portion of addressable memory before said testing step is complete; and returning said portion of addressable memory to said first processor independent of whether said portion of addressable memory is locked by another of the plurality of processors.

14. The method of claim 12, further comprising the steps of:

detecting an inoperative processor;

clearing a third locked-bit register corresponding to a third lock address register which has an address code which that transmitted with a lock request by said inoperative processor;

selecting a fourth address register whose contents matches an address code that was previously transmitted with a lock request by said inoperative processor;

setting a fourth locked-bit register corresponding to said fourth address register;

sending a second lock granted signal to a fourth processor that transmitted an address code which is stored in said fourth address register; and processing the selected portion of addressable memory at said fourth processor.

15. A method for granting exclusive access to a selectable portion of an addressable memory to a processor in a data processing system having a plurality of directly intercoupled storage controllers for controlling access to the addressable memory, and a plurality of processors for processing instructions and data stored in the addressable memory, wherein predetermined ones of the processors are directly coupled to predetermined ones of the storage controllers, and each storage controller controls access to a directly coupled addressable memory unit, whereby each processor, through the storage controller to which a processor is directly coupled, has access to addressable memory units controlled by the other storage controllers, the method comprising the steps of:

transmitting a lock request and an address code from a first processor to a first storage controller, wherein said address code specifies a portion of the addressable memory to which said first processor requires exclusive access; and said lock request specifies the request for exclusive access on said portion of memory;

prohibiting said first processor from processing said portion of addressable memory until a lock granted signal is received from the first storage controller;

transmitting said lock request and said address code from said first storage controller to a destination storage controller, wherein said destination storage controller controls access to said portion of addressable memory referenced by said address code;

testing, at said destination storage controller, whether said portion of addressable memory is locked by any another of the plurality of processors;

locking said portion of addressable memory if no others of the plurality of processors have said portion of addressable memory locked;

sending said lock granted signal from said destination storage controller to said first storage controller if said portion of memory is not locked by another of the plurality of processors; and sending said lock granted signal front said first storage controller to said first processor.

16. A method for granting exclusive access to a selectable portion of an addressable memory to a processor in a data processing system having a plurality of directly intercoupled storage controllers for controlling access to the addressable memory, and a plurality of processors for processing instructions and data stored in the addressable memory, wherein predetermined ones of the processors are directly coupled to predetermined ones of the storage controllers, and each storage controller controls access to a directly coupled addressable memory unit, whereby each processor, through the storage controller to which a processor is directly coupled, has access to addressable memory controlled by the other storage controllers, the method comprising the steps of:

transmitting a lock request and an address code from a first processor to a first storage controller, wherein said address code specifies a portion of the addressable memory to which said first processor requires exclusive access, and said lock request specifies the request for exclusive access on said portion of memory;

prohibiting said first processor from processing said portion of addressable memory until a first lock granted signal is received by said first processor;

transmitting said lock request and said address code from said first storage controller to a destination storage controller, wherein said destination storage controller controls access to said portion of addressable memory referenced by said address code;

testing, at said destination storage controller, whether said portion of addressable memory is locked by another of the plurality of processors;

enqueuing said lock request in a queue of lock requests in said destination storage controller if a second processor has said portion of addressable memory locked, wherein each lock request in said queue of lock requests is associated with one and only one of the plurality of processors;

locking said portion of addressable memory if said portion of addressable memory is not locked by another of the plurality of processors;

sending said lock granted signal from said destination storage controller to said first storage controller if said portion of memory is not locked by another of the plurality of processors;

transmitting said lock granted signal from said first storage controller to said first processor;

transmitting a lock release request from said first processor to said first storage controller when said first processor has completed processing on said portion of addressable memory, wherein said lock release request indicates that exclusive access to said portion of the addressable memory is no longer necessary;

transmitting said lock release request from said first storage controller to said destination storage controller;

releasing a lock on said portion of addressable memory at said destination storage controller upon receipt of said lock release request; and selecting one lock request from said queue of lock requests after said releasing step; and granting exclusive access to another of said plurality of processors associated with said one lock request.

* * * * *